Jan. 29, 1957  G. P. BOSOMWORTH  2,779,847
ELECTRONIC VULCANIZATION OF RUBBER
Filed Sept. 29, 1951.
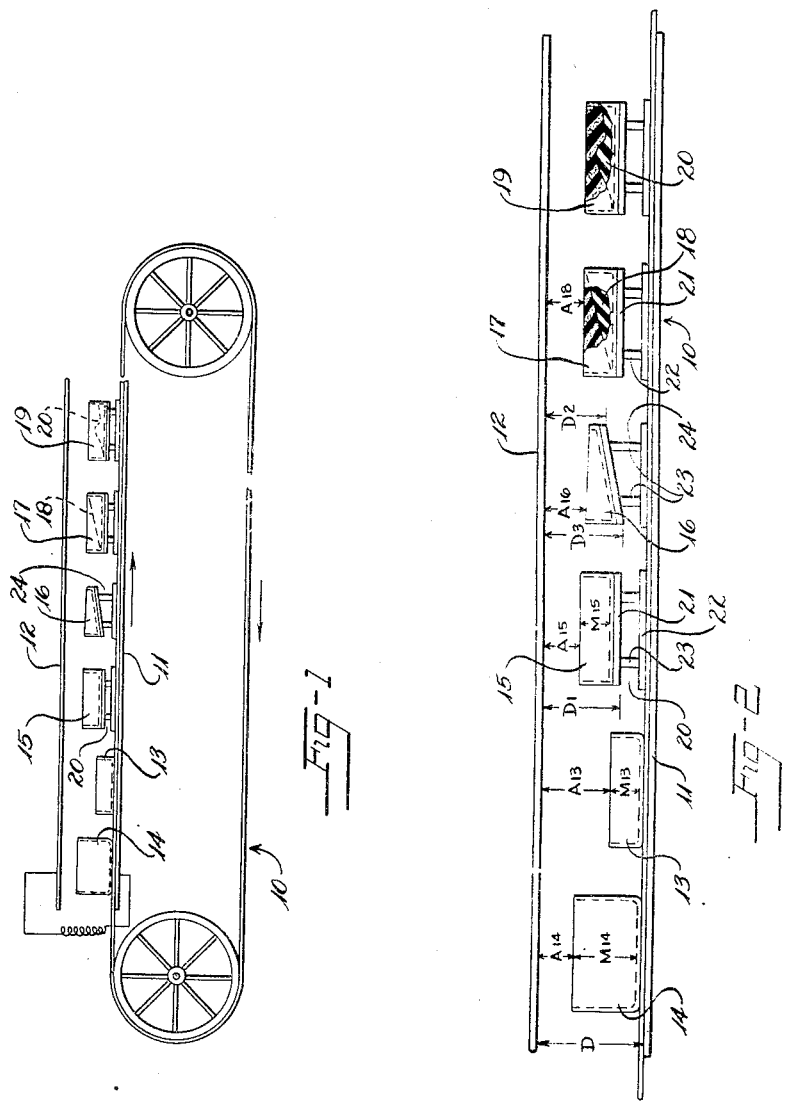
INVENTOR.
George P. Bosomworth
BY United States Patent Office 2,779,847
Patented Jan. 29, 1957

2,779,847

ELECTRONIC VULCANIZATION OF RUBBER

George P. Bosomworth, Akron, Ohio, assignor to The Firestone Tire & Rubber Company, Akron, Ohio, a corporation of Ohio Application September 29, 1951, Serial No. 248,919

1 Claim. (Cl. 219—10.41)

This invention relates to high frequency curing of rubber and like materials, and more particularly to continuous curing of foam rubber articles of irregular shapes and varying thickness.

The use of a high frequency field is especially advantageous in the continuous vulcanizing of foam rubber. By such means a considerable thickness of foam rubber can be cured in a matter of minutes as compared with the much greater time required by the use of steam. In the continuous vulcanizing process foam rubber articles supported by molds are carried by conveyor means through a high frequency field which is produced by a pair of spaced electrodes connected to a suitable source of power. In commercial production the speed of the conveyor is substantially constant, and the characteristics of the high frequency field are maintained substantially uniform. Under such conditions, articles of different thickness will heat at different rates. One article may come to vulcanization temperature and be completely vulcanized an appreciable period of time before it leaves the high frequency field. At the same time another article may heat more slowly and just barely complete its vulcanization by the time it leaves the field. The speed of the conveyor must, therefore, be adjusted to insure vulcanization of the slower reacting articles. Because of this variance in heating time and because the speed of the conveyor must be geared to the slower heating articles, many articles, after being completely vulcanized, remain in the high frequency field occupying space and cycle time which could be more advantageously utilized in vulcanizing other articles. The full capacity of the continuous apparatus is not fully realized, and a loss of production time and of power, as well as other losses result.

According to the present invention, this problem of unequal rates of heating is met by the provision of means which has the effect of adjusting the electrode spacing in accordance with the variation of thickness of the foam rubber. This is done in such a manner that equal and uniform voltage gradients will be produced throughout the foam rubber articles. With equal voltage gradients, each unit volume of rubber will heat at the same rate and the curing of the different articles will proceed at equal rates. In practice, this equalization of the voltage gradients is accomplished by supporting the articles by so-called secondary electrodes which are shaped to the article to be cured and which transmit power from the fixed primary electrodes. These secondary electrodes act as electrical extensions of the primary electrodes, and serve to vary the effect of the electrode spacing for each particular article in order to produce the desired voltage gradients.

A general object of the invention, therefore, is to provide means for uniformly heating and curing articles of rubber and the like in a high frequency field. Another object is to provide for the continuous high frequency curing of rubber articles of irregular shape and varying thickness at substantially equal rates of cure. Another object is to provide means for increasing the rate of heating of rubber articles in continuous vulcanizing apparatus so as to obtain the full productive capacity of the apparatus. Another object is to provide a method and means for vulcanizing by means of a high frequency electrical field so as to obtain the utmost in economy of operation and speed and convenience of production.

Further objects and advantages will be apparent from the following description of the invention, reference being had to the accompanying drawings in which:

Figure 1 is a diagrammatic side elevation of apparatus for continuous vulcanization of foam rubber articles and the like; and Figure 2 is a diagrammatic sketch of a portion of Figure 1, showing on a somewhat enlarged scale several molds positioned between the primary electrodes of the apparatus, together with means embodying the invention for producing substantially equal voltage gradients within the molds.

The invention as illustrated in connection with apparatus for continuous vulcanization of foam rubber which, as shown in Figure 1, comprises an endless belt conveyor 10 which carries a plurality of molds containing foamed and gelled latex between a pair of primary electrodes 11 and 12. The electrodes take the form of spaced parallel plates connected to a suitable source of power, not shown, and are adapted to produce a high frequency electrical field having a frequency in the order of 10 to 15 megacycles or more. The lower electrode 11 is positioned just beneath the belt conveyor and may serve as a support for the belt if desired. The upper electrode 12 is positioned above the top of the molds and is spaced therefrom to provide ample clearance. The belt travels from left to right, as viewed, at a speed to hold the molds within the high frequency field, i. e., between the plates, for a length of time sufficient to allow vulcanization to be complete.

As the molds containing the foam rubber move through the high frequency field, power is consumed within the foam rubber in the form of heat losses which rapidly bring the rubber to vulcanizing temperature. The rate of production of heat within the rubber depends (among other things) upon the voltage gradient, i. e., the voltage drop across a given thickness of rubber; and the magnitude of the voltage gradient, at any point, in turn, for a given electrode spacing and a given voltage across the primary electrodes, depends upon the ratio of the thickness of the foam rubber to the size of the air gap.

For example, referring to Figure 2, the voltage gradient in mold 13 is appreciably less than that in mold 14, because the air gap for mold 13 indicated at $A_{13}$ is about two-thirds the electrode spacing indicated at D, whereas the air gap for mold 14, indicated at $A_{14}$ is only about one-third the spacing D. Since the dielectric constant of air is much lower than that of rubber, in the ratio of about 4 to 1, the voltage drop across $A_{13}$ is very much greater than the voltage drop across $M_{13}$. The air gap $A_{13}$ thus causes most of the voltage drop across the electrodes leaving only a small drop across $M_{13}$. In contrast, the smaller air gap $A_{14}$ permits a much greater voltage drop across $M_{14}$ (the thickness of material in mold 14) which more than balances the greater thickness of material in mold 14. The voltage gradient in $M_{14}$ is, therefore, greater than in $M_{13}$ and the rate of heating of $M_{14}$ is correspondingly faster. The air gaps between the molds and the upper electrode 12 thus play a more decisive role in determining the voltage gradients in the foam rubber than does the thickness of the rubber itself.

The invention takes advantages of this relationship between air gap and voltage gradient to increase the rate of heating of articles having the lesser thicknesses of foam rubber by reducing the air gap for those thicknesses. This is best accomplished by providing means which elevate the molds in a manner to decrease the effective electrode spacing and also decrease the air gap. The means preferably take the form of aluminum or other metallic supports which are placed beneath the molds to raise the molds by the desired amounts.

For example, in Figure 2, the mold 15, which is identical in all respects to mold 13, is supported by an aluminum member 20, comprising the plates 21 and 22 and the connecting members 23. The member 20, because it is of conducting material, acts not only as a support but also as an extension of the primary electrode 11. For this reason it will be convenient hereafter to refer to the member 20 as a secondary electrode member.

The effective electrode spacing for mold 15 is indicated at $D_1$ as being the distance between the electrode 12 and the supporting plate 21 of the secondary electrode. The reduced air gap $A_{15}$ in such a case represents a much smaller fraction of the electrode spacing $D_1$ than in the case of mold 13. As a result, the voltage drop across $A_{15}$ is appreciably less than the voltage drop across $A_{13}$, and the voltage gradient in $M_{15}$ is increased as compared with the voltage gradient in $M_{13}$. Provided the secondary electrode 20 is of the proper height, the air gap $A_{15}$ will be such that the voltage gradient in $M_{15}$ is equal to the voltage gradient in $M_{14}$; and the rate of heating in the molds 14 and 15 will be equal. The material in these two molds, therefore, will cure at the same rate and within the same period of time. It will be remembered that throughout this discussion the voltage drop across the electrodes will be constant no matter what the electrode spacing may be.

Thus, articles of varying thicknesses can be vulcanized in equal times by adjusting the air gap which is the variable most easily controlled.

As another example, consider an article in which the thickness within the article itself varies considerably over its length as shown in mold 16. With such an article, uniform heating throughout the varying thickness of the article can be obtained by providing an electrode support 24, which will again adjust the air gap according to the principle just described. It will be noted that with such a support the effective electrode spacing varies from a distance $D_2$ to a distance $D_3$, and that the percentage of air gap with respect to electrode spacing decreases from the spacing $D_2$ toward the spacing $D_3$. It will be noted also that in order to obtain a uniform, voltage gradient, the air gap $A_{16}$ increases slightly toward the right as shown. As a result, there is a small voltage drop across the material at the $D_2$ spacing and a larger voltage drop across the material at the $D_3$ spacing. However, since the thickness of the material varies as the electrode spacing and the air gap varies inversely with the material thickness, the voltage gradients throughout the material will be approximately equal. The result is that the material will heat uniformly and will reach a cure throughout the article at substantially the same time.

In some cases it may be desirable to cure an article of varying thickness, such as that in mold 16, while maintaining the air gap constant and uniform rather than varying as in mold 16. This can be done by utilizing a mold 17 of uniform depth similar to mold 15 in conjunction with an auxiliary mold element indicated at 18 and shown in Figure 2 to be wedge-shaped in section. The element 18 is of rubber or other dielectric material having dielectric properties substantially equal to the material being cured, in this case foamed latex. It will be apparent that the voltage gradient across mold 17 at the left of the mold will be substantially equal to the voltage gradient through the foamed latex and through the mold element 18 at the right of mold 17. The greater thickness of foamed latex at the left of the mold will therefore cure at the same rate as the lesser thickness of foamed latex at the right of the mold.

If the article to be cured is of irregularly varying thickness, such as that shown in mold 19, one or more dielectric mold pads 20 of appropriate shape and similar in all other respects to element 18 may be provided to produce uniform voltage gradients in the same manner as provided for in mold 17.

With respect to both molds 17 and 19, it will be noted that the principle of producing predetermined, voltage gradients by varying the air gap and effective electrode spacing remains unchanged by the added provision of compensating for irregularly varying thickness of the article by auxiliary dielectric mold elements.

It is to be understood throughout this discussion that the molds are of dielectric material such as wood, plastic, or the like.

For practical purposes, all that is usually required in order to produce reasonably equal voltage gradients in foam rubber articles of varying thickness is the positioning of each article by secondary electrode members to bring the top surfaces of the articles to the same level and equally spaced from the top electrode with the air gaps being equal to the average gap required for the various thicknesses of material. This makes all the air gaps equal in linear extent but unequal in effect because the equal air gaps represent varying percentages of effective electrode spacing. When the articles are thin, the air gaps will be relatively large, and where they are thick, the air gaps will be relatively small in proportion to effective electrode spacing. Where the air gaps represent relatively large portions of the electrode spacing, they produce a large voltage drop and leave less voltage available to produce heat in the thin layers of material, whereas when the air gaps represent smaller fractions of the electrode spacing, they consume less voltage, and there is more voltage available for the greater thicknesses of material. Such an arrangement will produce roughly equivalent voltage gradients in the various articles and will enable vulanization to proceed in each article at about the same rate, at least within practical limits.

The raising of a mold toward the top electrode by means of a conducting support thus decreases the air gap and the effective electrode spacing and increases the voltage gradient within the material to be heated, enabling the material to heat faster and more uniformly. Each article will cure in the same time, and, as a result, the conveyor belt can be driven at full speed without appreciable loss in capacity due to differences in the rate of cure between different articles. In this manner, greater and more economical production is achieved.

The advantages of the present invention can be obtained in a batch process of high frequency vulcanization as well as in a continuous process, for the realization of equal voltage gradients in articles of varying thickness will produce the desired equal rates of heating in both processes.

Although the invention is described in connection with the vulcanizing of foam rubber, it is to be understood that the principle is equally applicable to the heating and curing of other materials, and that the above illustration is given by way of example, and not by limitation.

Various modifications and changes will occur to those skilled in the art without departing from the spirit and scope of the present invention, the essential features of which are summarized in the following claim.

What is claimed is:

The method of continuously heating a plurality of articles of dielectric material of varying thickness in a high frequency electrical field produced by a pair of parallel electrodes, which comprises moving said articles through said field with the top surfaces of said articles substantially parallel to and equally spaced from the top electrode and with the bottom surfaces of said articles having electrical connection with said bottom electrode whereby there is substantially no voltage drop between said bottom surfaces and electrodes.

References Cited in the file of this patent

UNITED STATES PATENTS

| | | |
|---|---|---|
| 2,321,131 | Cradell | June 8, 1943 |
| 2,370,624 | Gillespie | Mar. 6, 1945 |
| 2,473,881 | Hagopian | June 21, 1949 |
| 2,522,487 | Warren | Sept. 12, 1950 |
| 2,548,093 | Blewitt | Apr. 10, 1951 |
| 2,560,783 | Scott | July 17, 1951 |
| 2,616,025 | Kinn | Oct. 28, 1952 |
| 2,632,091 | Hagopian | Mar. 17, 1953 |

FOREIGN PATENTS

| | | |
|---|---|---|
| 577,208 | Great Britain | May 9, 1946 |